United States Patent [19]
Broadhead

[11] 3,798,069
[45] Mar. 19, 1974

[54] BATTERY STRUCTURE INCORPORATING CHLORINE SCAVENGER

[75] Inventor: John Broadhead, Morristown, N.J.

[73] Assignee: Bell Telephone Laboratories, Incorporated, Murray Hill, N.J.

[22] Filed: May 10, 1972

[21] Appl. No.: 251,921

[52] U.S. Cl. .................................. 136/26, 136/154
[51] Int. Cl. .......................................... H01m 39/04
[58] Field of Search ....... 136/26, 27, 154, 155, 179, 136/78, 163; 423/241

[56] References Cited
UNITED STATES PATENTS
3,586,539   6/1971   Lauck ................................... 136/26
2,994,626   8/1961   Ruetschi .............................. 136/154
3,462,303   8/1969   Reber .................................. 136/179

FOREIGN PATENTS OR APPLICATIONS
389,738   3/1933   Great Britain ..................... 136/154

Primary Examiner—Donald L. Walton
Attorney, Agent, or Firm—G. S. Indig

[57] ABSTRACT

A lead-acid battery is described which incorporates a chlorine scavenger which converts molecular or ionic chlorine to an organic chloride which is inert and does not interfere with the electrochemical process of battery operation. Organic compounds which are useful as chlorine scavengers contain a multiple carbon-to-carbon bond and contain a polar group to make the scavenger substance soluble in the electrolyte. Chlorine scavenger material is especially useful in lead-acid batteries used primarily in the float condition, and/or where the battery is hermetically sealed. Scavenger material can be incorporated in the battery in a variety of ways as, for example, in the separator material.

4 Claims, 2 Drawing Figures

PATENTED MAR 19 1974                                3,798,069

BATTERY STRUCTURE INCORPORATING CHLORINE SCAVENGER

BACKGROUND OF THE INVENTION

1. Field of the Invention

The invention relates to a lead-acid battery, and in particular to a lead-acid battery which contains a chlorine scavenger material.

2. Description of the Prior Art

The lead-acid battery is of considerable commercial importance because of its extensive use in automobiles and as a source of emergency power in the telephone industry. It has been recognized for some time that the presence of chlorine in lead-acid batteries has a serious effect in reducing the life of the cell (see Crennell and Milligan, *Trans. of the Fara. Society*, 25, 159 (1929)). For this reason attempts are made to exclude chlorine from lead-acid batteries by suitable purification of sulfuric acid and water which make up the electrolyte. In ordinary use where the battery is extensively charged and discharged, any chlorine present in the battery tends to come off as a gas. In the case of automobile batteries which are designed for relatively short term use, chlorine accumulation is often not the limiting factor in determining battery life.

However, under certain circumstances chlorine is important in limiting the useful life of a battery partly because longer life is expected from the battery and partly because the unique characteristics of the battery tend to increase the problem of chlorine accumulation. Where longer battery life is required and/or where chlorine contamination is not easily avoided, chlorine accumulation is a factor to be considered in limiting the useful life of the battery. Special uses or designs of batteries might lead to excessive accumulation of chlorine. For example, some batteries are used as a standby source of power and are only used rather infrequently. These batteries are maintained in a float charging condition. Under these conditions chlorine sometimes originating from the water added to the battery and sometimes from plastic components of the battery which contain chlorine tends to accumulate. Also, in sealed batteries chlorine either originally in the battery or from plastic parts of the battery containing chlorine tends to accumulate. This has two detrimental effects on the battery. First, it provides an additional parasitic reaction at the positive electrode which converts chloride ion to chlorine. This reduces the efficiency of the battery. Further, the molecular chlorine produced at the positive electrode dissolves in the electrolyte and migrates to the negative electrode. Here the molecular chlorine is converted to chloride ion. This process leads to cyclic discharge of the battery even though no current is being taken out of the battery. This certainly is detrimental to any battery but is particularly disadvantageous in the case of batteries used as a standby source of power.

The second detrimental effect is the fact that the potential at the positive, lead dioxide electrode is lowered by the presence of chloride ion. Where constant voltage is used either to charge the battery or maintain the battery in a float condition, the voltage at the negative electrode is increased. This enhances the dendritic growth of lead at the negative electrode. This is a prevalent cause of failure in lead-acid batteries since the dendritic growth often occurs through the separator which shorts out the battery.

SUMMARY OF THE INVENTION

The invention is a battery which contains a chlorine scavenger which converts active chlorine in the battery to an organic chloride which renders the chlorine inert to the electrode processes in the battery. These chlorine scavengers react with the chlorine to form the organic chloride. Only a specific class of organic compounds are suitable as chlorine scavengers. First of all, the organic compound should contain at least one aliphatic multiple carbon-to-carbon bond; second, the compound must contain at least one substituent group such as an aromatic group or preferably polar group to insure that the scavenger will be soluble in the electrolyte; and third, the resulting organic chloride must not react with the electrolyte in the battery or interfere with the electrochemical processes which take place in the lead-acid battery. For convenience in keeping the weight and expense of scavenger material low while providing adequate sites for reaction of chlorine, the number of carbon atoms in the scavenger molecule should not exceed 25 and preferably not exceed 15. Representative examples of chlorine scavenger compounds which are used are mesityl oxide, methacrylic acid, 2-propyn-1-ol, eugenol, diallylmaleate, aconitic acid, 2-butyn-1, 4-diol and butene- 1, 4-diol. These compounds convert chlorine in batteries to organic chlorides which are inert to electrochemical processes taking place in the battery.

DETAILED DESCRIPTION

Figure 1:
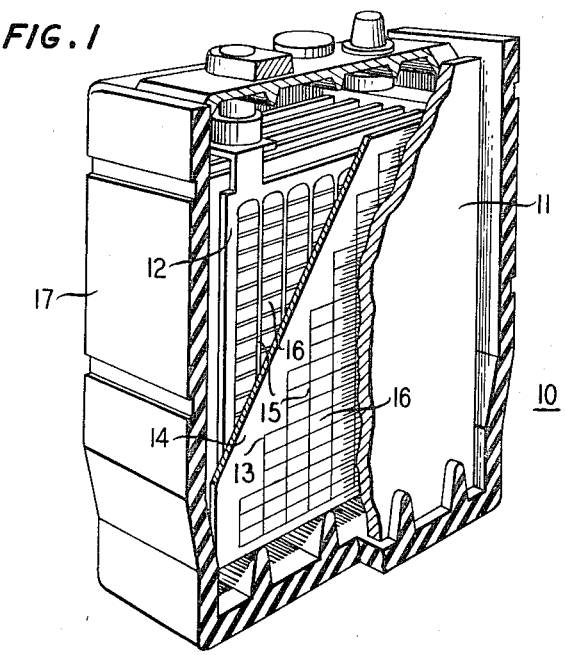
FIG. 1 is a perspective view partly in section showing a typical lead-acid battery containing separator, container and electrolyte.

1. Glossary of Compounds a. Mesityl Oxide

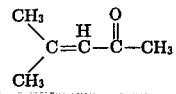

b. Methacrylic Acid

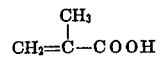

c. 2-propyn-1-ol

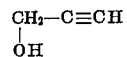

d. Eugenol

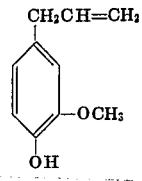

e. Diallylmaleate

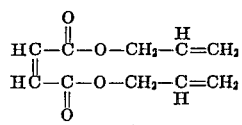

f. Aconitic Acid

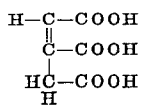

g. 2-Butyn-1, 4-diol

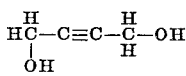

h. Butene-1,4-diol

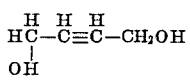

2. Characteristics of the Organic Scavenger Compound

The invention in its broadest terms is the inclusion of organic substances in batteries which contain two types of structural units. The first structural unit should react with chlorine to form an organic chloride which is inert to electrochemical processes which take place in lead-acid batteries. Although many such structural units exist, the invention is limited to removal of chlorine by an addition reaction. Thus, the structural unit should be a multiple carbon-carbon bond; that is, a double or triple carbon-carbon bond. The organic scavenger materials are limited to compounds with double or triple carbon-carbon bonds since the organic chloride compound resulting from chloride addition has reduction potentials (approximately 1.6–2.5 volts) which are greater than that found in lead-acid batteries (approximately one volt for the negative electrode). Thus, the organic chlorides will not interfere with the electrochemical processes in the lead-acid battery.

The second structural unit is required to insure sufficient solubility of the organic scavenger. This involves the incorporation of an aromatic or polar group to insure solubility in the aqueous electrolyte. Solubility need not be very great since the chlorine concentrations contemplated for removal are generally in the 1–1,000 parts per million range. For example, the inclusion of certain aromatic groups such as phenyl, naphthyl, etc., is often sufficient to yield sufficient solubility of the scavenger material. Other more polar groups may also be used and are preferred because of greater solubility. A partial list is the ketone group, carboxylic and other acid groups, the alcohol group, and the ester group, to name a few. Aliphatic compounds containing a multiple carbon-carbon bond and these substituent groups are compatible with the electrochemistry of the battery and do not react with the electrolyte or the electrodes.

3. Specific Examples

Specific examples are described to illustrate the invention. Mesityl oxide may be included in the battery either by direct addition to the electrolyte, incorporation in the battery separators or casing, or incorporation in the electrodes. This compound under conditions generally found in lead-acid batteries reacts with chlorine to form an organic chloride which is inert to the oxidation reduction reactions in the battery. Methacrylic acid and 2-propyn-1-ol also react with chlorine to form inert organic chlorides. Eugenol also reacts with chlorine. However, reaction takes place at the double bond on the aliphatic part of the molecule. Some reactions take place with diallylmaleate, aconitic acid, 2-butyn-1, 4-diol and butene-1, 4-diol.

As mentioned above the chlorine scavenger may be incorporated in the battery in a variety of ways. Particularly convenient is the incorporation of the scavenger in the separator material. The concentration levels and distributions are arranged in such a way that the scavenger material is released at a predetermined rate which approximately matches the rate which chloride ions accumulate in the battery electrolyte. Thus protection from the detrimental effects of chlorine can be provided over long periods of time.

4. The Drawing

FIG. 1 is a design of a conventional rectangular battery 10 which is made up of two or more cells separated by a partition 11. Each cell is provided with positive electrodes 12 and negative electrodes 13 insulated from one another by a separator 14. Spaces within the case 17 and between the separators 14 are filled with electrolyte which is generally aqueous sulfuric acid. Chlorine scavenger material may be incorporated in the case, separator or partition as well as other parts of the battery.

Figure 2:
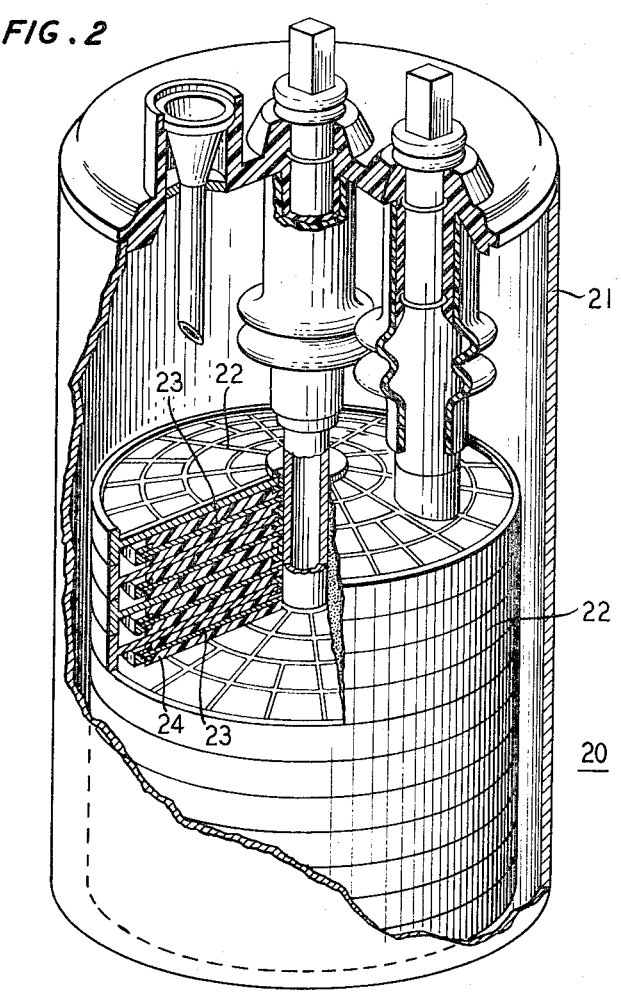
FIG. 2 is a perspective view partly in section of an alternative battery structure.

The structure shown in FIG. 2 is a new design currently under consideration for long term stand-by use. Structurally this apparatus 20 includes an outer container 21, horizontally disposed positive electrodes 22 and negative electrodes 23 which may be conical in shape. Electrical isolation of the negative and positive electrodes is accomplished by means of separators 24. The chlorine scavenger material may be incorporated in the battery in a variety of ways, including direct addition to the electrolyte, incorporation in the case or separator material of the battery.

What is claimed is:

1. A lead-acid battery containing electrodes, electrolyte, separators, containers and partitions characterized in that an organic scavenger substance is present which reacts with chlorine, in which said organic scavenger substance is selected from the group consisting of mesityl oxide, 2-propyn-1-ol, eugenol, diallylmaleate, aconitic acid, 2-butyn-1, 4-diol and butene-1, 4-diol.

2. The battery of claim 1 in which the organic scavenger substance is incorporated in the separators.

3. The battery of claim 1 in which the organic scavenger substance is incorporated in the container.

4. The battery of claim 1 in which the organic scavenger substance is incorporated in the partition.

* * * * *